US005664148A

United States Patent [19]
Mulla et al.

[11] Patent Number: 5,664,148
[45] Date of Patent: Sep. 2, 1997

[54] CACHE ARRANGEMENT INCLUDING COALESCING BUFFER QUEUE FOR NON-CACHEABLE DATA

[75] Inventors: Dean Mulla; Sorin Iacobovici, both of San Jose, Calif.

[73] Assignee: Institute for the Development of Emerging Architectures L.L.C., Cupertino, Calif.

[21] Appl. No.: 515,551

[22] Filed: Aug. 17, 1995

[51] Int. Cl.⁶ .................................. G06F 12/08
[52] U.S. Cl. .................. 711/138; 395/874; 711/154
[58] Field of Search ........................ 395/481, 872, 395/874, 875, 445, 465, 466, 250

[56] References Cited

U.S. PATENT DOCUMENTS

| | | | |
|---|---|---|---|
| 4,805,098 | 2/1989 | Mills | 395/250 |
| 5,297,270 | 3/1994 | Olson | 395/403 |
| 5,404,489 | 4/1995 | Woods et al. | |
| 5,459,842 | 10/1995 | Begun | 395/250 |
| 5,471,598 | 11/1995 | Quattromani | 395/449 |
| 5,535,345 | 7/1996 | Fisch | 395/309 |
| 5,551,004 | 8/1996 | McClure | 395/465 |

OTHER PUBLICATIONS

The Cache Memory Book, J. Handy ISBN 0-12-3222985-5 (1993).

Fast Efficient Simulation Of Write-Buffer Configurations, Abraham, et al., System Sciences, 1994 Annual Hawaii Int'l. Conference, vol. 1, IEEE/IEE Publications Ondisc, pp. 231-240.

Publication No.: 06314252 A; Published: Nov. 8, 1994; Applicant: Hitachi, Ltd., p. 1.

Primary Examiner—Tod R. Swann
Assistant Examiner—Christopher S. Chow
Attorney, Agent, or Firm—Jack A. Lenell

[57] ABSTRACT

An apparatus including a cache subsystem arrangement for efficient management of input/output operations and of memory shared by processors in a multiprocessor system. The apparatus includes a central processing unit, an input/output device such as a network device or a display device for example, and the cache arrangement, which includes a coalescing buffer coupled with the data processing unit for receiving non-cacheable data from the processing unit. The non-cacheable data is combined in the coalescing buffer into non-cacheable data blocks. A system bus is coupled with the buffer and the input/output device for storing the non-cacheable data blocks to the input/output device. By combining the non-cacheable data before storage to the input/output device, the coalescing buffer provides higher performance in the multiprocessor system, since fewer bus transactions are issued for serial store operations and more stores can complete in a given amount of time than if they were issued singly on the bus. This is particularly advantageous in the multiprocessing system since multiple processors must compete for limited bus transaction bandwidth.

8 Claims, 3 Drawing Sheets

CACHE ARRANGEMENT INCLUDING COALESCING BUFFER QUEUE FOR NON-CACHEABLE DATA

FIELD OF THE INVENTION

The present invention relates to computer systems, and more particularly to a computer system implementation for providing efficient management of input/output operations and of memory shared by processors in a multiprocessor (MP) system.

BACKGROUND OF THE INVENTION

In multiprocessor systems, multiple central processing units share a system bus for various transactions, including non-cacheable data transactions for Input/Output operations. For the various transactions the bus has a limited bandwidth that must be shared by the multiple central processors. Accordingly, it is important to reduce the bus bandwidth needed for non-cacheable data transactions of each processor, so that there is more effective bandwidth available for use by other processors in the multiprocessor system and by other types of transactions.

Furthermore in multiprocessor systems, multiple central processing units share cacheable data in memory. This data could exist in several different locations including high speed cache memory as well as main memory. If a particular data at a certain address is most recently modified in one of the memory locations, then the most recently modified data must be identified and available to all CPU's requesting the particular data.

What is needed is an apparatus for efficiently managing Input/Output operations and memory shared by processors in a multiprocessor (MP) system.

SUMMARY OF THE INVENTION

The present invention provides an apparatus including a novel cache subsystem arrangement for efficient management of Input/Output (I/O) operations and of memory shared by processors in a multiprocessor (MP) system.

Briefly, and in general terms, the present invention includes at least one central processing unit for generating non-cacheable data. Although multiple central processing units are desired in a preferred mulitprocessor system embodiment, it should be understood that the invention also enhances I/O performance even for single processor embodiments. Control logic hardware is coupled with the central processing unit for generating a signal indicating that the data is non-cacheable and can be combined into non-cacheable data blocks. The novel cache arrangement of the invention includes a coalescing buffer, which is coupled with the data processing unit and the control logic. The coalescing buffer is adapted for receiving the non-cacheable data from the processing unit and for combining the data into non-cacheable blocks of data in response to the signal from the control logic.

The invention further includes an input/output device such as a network device or a display device. A system bus is coupled with the coalescing buffer and the input/output device for storing the combined non-cacheable data blocks to the input/output device. By combining the data into non-cacheable data blocks before storing them to the input/output device, the coalescing buffer provides higher performance in the multiprocessor system because fewer bus transactions are issued for serial store operations and more stores can complete in a given amount of time than if they were issued singly on the bus. This is particularly advantageous in the multiprocessing system since multiple processors must compete for limited system bus transaction bandwidth.

In the preferred embodiment of the invention, the coalescing buffer is adapted for including disjoint bytes within a data block. The buffer is further adapted for issuing a bus transaction to empty data blocks from the buffer in a minimal number of bus transactions. The buffer is further adapted for detecting address and access overlaps with already resident data within the buffer, providing for flushing out the contents of the buffer before satisfying the new store. The buffer is further adapted for detecting non-store access events and flushing out the data in the buffer in response to the non-store access events. Such non-stores access events include overlapping loads as well as data sequencing and control instructions.

The invention includes a method for coalescing stores in response to the signal that non-cacheable data can be coalesced. Although stores are coalesced in the preferred embodiment as discussed in detail subsequently herein, it should be understood that the present invention is not strictly limited to coalescing stores. The principles of the invention are likewise applicable to loads, with beneficial results.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENT

Figure 1:
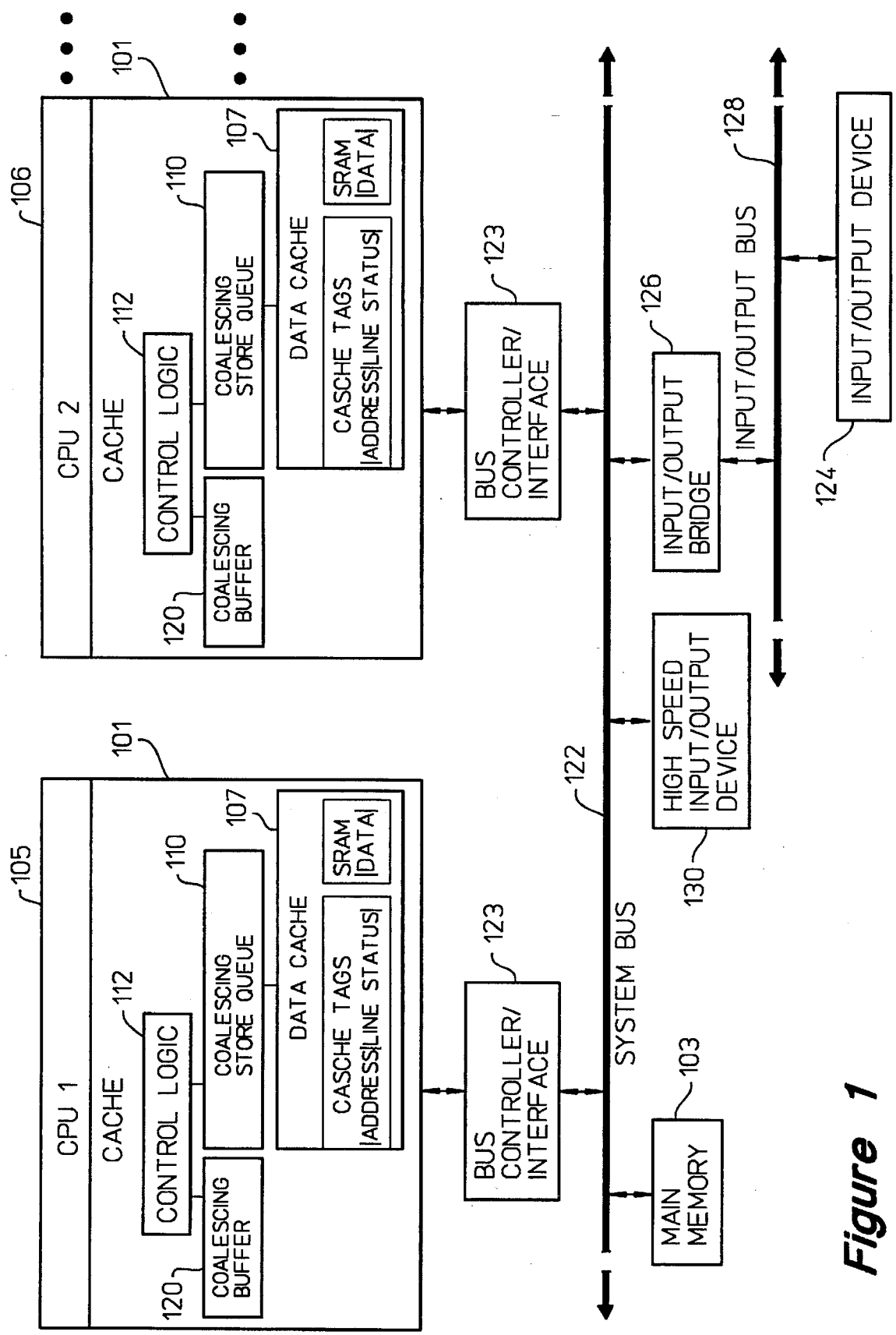
FIG. 1 is a simplified partial block diagram of a preferred embodiment of the invention.

FIG. 1 is a simplified partial block diagram of a preferred embodiment of the invention. A multiprocessing (MP) system 100 employs a plurality of preferred cache subsystem arrangements 101 of the invention for efficient management of input/output operations and of memory shared by central processors in a multiprocessor (MP) system. Each cache arrangement provides high-speed memory coupled between main memory 103 and a respective first and second central processing unit (CPU) 105, 106. The central processing unit (CPU) is a part of a data processing unit that fetches and executes instructions. The cache arrangements 101 are continually updated to contain recently accessed contents of main memory to reduce access time. When a program makes a memory request, the CPU first checks to see if cacheable data is in the cache arrangement so that it can be retrieved without accessing main memory 103.

In particular, each cache arrangement includes a respective data cache having one or more levels and including a Static Random Access Memory (SRAM) for storing cacheable data and cache tags having address and line status information for identifying the cacheable data stored in the SRAM. Each cache arrangement further includes a respective coalescing store queue (STQ) 110, which queues stores of cacheable data received from an instruction pipe of the processor until their page mapping and protection are validated, and the stores can therefore be completed.

Control logic hardware 112 is coupled with the central processing unit for determining whether store data is cacheable or non-cacheable, and whether the data can be coalesced. The control logic generates a signal indicating that the data is non-cacheable and can be combined into non-cacheable data blocks. In the preferred embodiment, the control logic includes records of memory mapped I/O addresses of the I/O devices coupled to the system bus and further includes comparators for comparing the load or store addresses of the non-cacheable data to the records of memory mapped I/O address and for generating the signal indicating that the data is non-cacheable and can be combined into non-cacheable data blocks. Although stores are coalesced in the preferred embodiment as discussed in detail subsequently herein, it should be understood that the present invention is not strictly limited to coalescing stores. The principles of the invention are likewise applicable to loads, with beneficial results.

Each cache arrangement further includes a respective coalescing buffer (CB) 120 coupled with the central processing unit for receiving non-cacheable data from the processing unit. In the preferred embodiment, the central processor generates non-cacheable data broken up into chunks of one byte, two bytes, four bytes, or eight bytes. The non-cacheable data is combined or "merged" in the coalescing buffer into non-cacheable data blocks, as appropriate byte enable signals are asserted by the control logic.

Each data block of the coalescing buffer of the preferred embodiment includes a data line sixty four data bytes wide. In the preferred embodiment, the coalescing buffer stores a starting address of a line aligned chunk of memory that is being accessed, and also contains valid bits for each byte so as to provide a preferred sixty four valid bits as write enables of the sixty four data bytes of the data block. The coalescing buffer is coupled with a central processing unit for accepting non-cacheable data written from the central processing unit, as well as a physical page number (PPN) and other address bits of the load or store data.

A system bus 122 is controlled by a respective bus controller/interface 123 coupled with each of the central processing units. The system bus is coupled with the coalescing buffer 120 and an input/output device 124 for storing the non-cacheable data blocks to the input/output device. In the preferred embodiment, the input/output device 124 is coupled with the system bus 122 through an input/output bridge 126 and an input/output bus 128, as shown in FIG. 1. Additionally, a high speed input/output device 130 is directly coupled with the system bus 122.

The coalescing buffer is adapted for coalescing the data, and is coupled with the system bus for storing the coalesced data in a single bus transaction, so as to advantageously conserve bandwidth of the system bus. This in turn allows greater available bandwidth of the system bus for communications between the CPU and the I/O bridge coupled to the bus.

By combining the data into blocks before storage to the input/output device, the coalescing buffer provides higher performance in the multiprocessor system, since fewer system bus transactions are issued for serial store operations and more stores can complete in a given amount of time than if they were issued singly on the bus. This is particularly advantageous in the multiprocessing system since multiple processors must compete for limited system bus transmission bandwidth.

Figure 2:
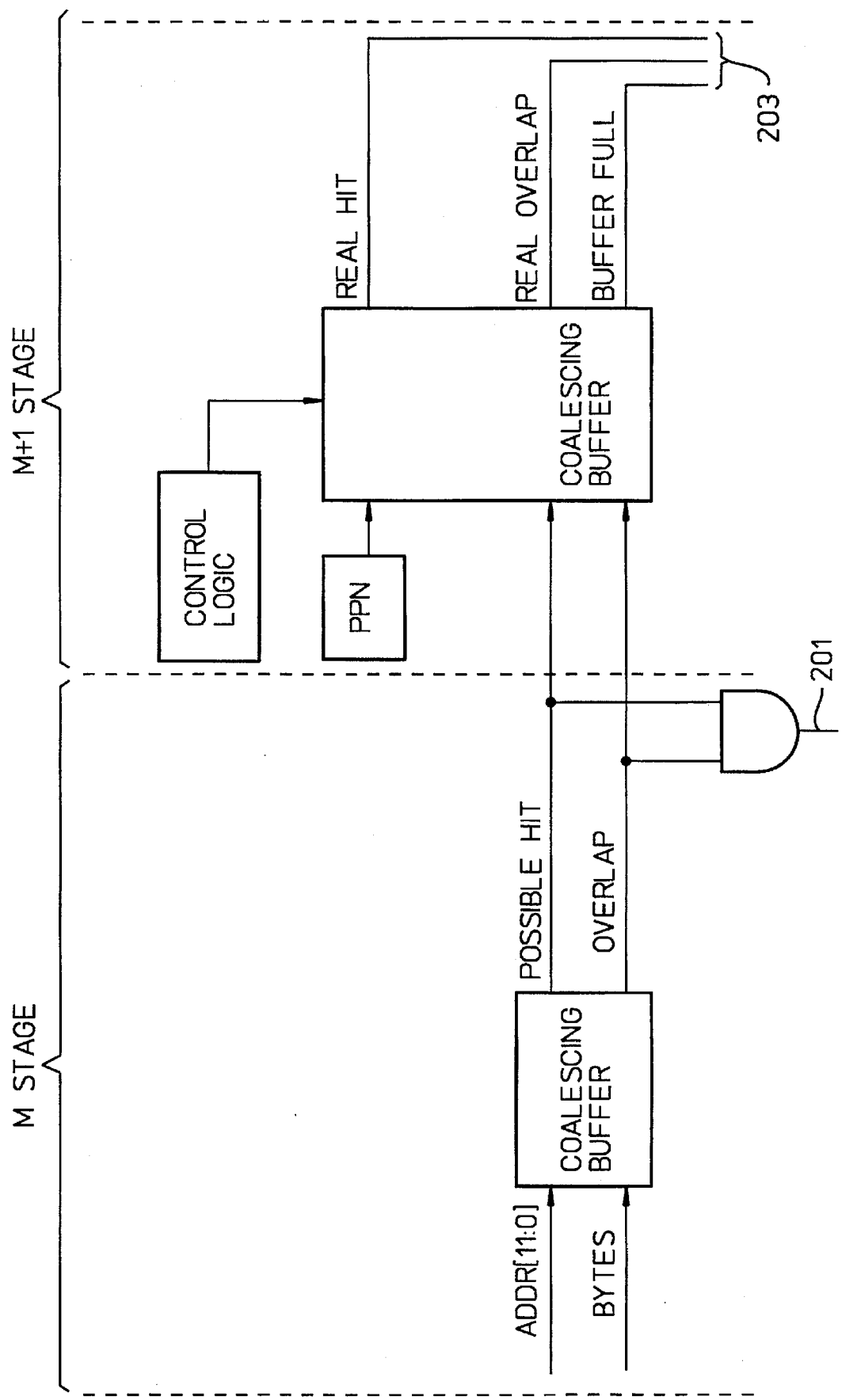
FIG. 2 is a simplified pipeline diagram illustrating operation of the preferred embodiment of the invention.

A simplified pipeline diagram is shown in FIG. 2 to illustrate operation of the coalescing buffer (CB) in the present invention. An initial stage (or "M stage") of an instruction pipe of the central processing unit is where the cache subsystem arrangement is accessed for loads, and an M+1 stage is a subsequent stage of the instruction pipe. Under routine operation of the invention the M stage of the instruction pipe is used for aligning the load data.

New loads from the M stage of the instruction pipe search not only the STQ, but also the CB buffer for Store-Fetch-Interlock (SFI) conditions. The SFI condition indicates that a store instruction has executed, and there is a load instruction following it that accesses the same data (or even the same cache line) as the store accessed. If an SFI is detected for the CB, the M stage of the instruction pipe handling the load is interlocked until the SFI condition expires. An example of the expired SFI condition is that the matching CB entry sends the data to the I/O graphics or networking device, and the data location of the CB is thereby freed for storage.

Specific to the CB is a Store-Store Interlock (SSI) condition. In contrast to the store queue (STQ), since the CB handles non-cacheable data, such as I/O device data, more recent data cannot overwrite in the CB entry older data having the same address as the more recent data. If an SSI condition is detected for a new, non-cacheable and coalescing store, the M stage instruction pipes are interlocked until the SSI condition expires.

The CB is flushed, or a specific entry in the CB is flushed, upon the following occurrences. A memory ordering instruction is executed, which requires the CB to be emptied and the contents of the CB to be accessible by other CPU's in a multiprocessing system. A coalescing store is executed that overlaps an existing (already stored to) location bytewise within the coalescing buffer. A load is executed that overlaps anywhere on the block contained in the coalescing buffer. A store of a size the coalescing buffer doesn't support is executed, and that store overlaps an existing valid location in the CB. The flush is sent to a bus interface unit as full bus width data blocks having separate valid bits for each byte, which indicate whether or not valid data exists for each byte.

The pipeline will stall when a condition that may require flushing the coalescing buffer is detected. This must happen before complete information is known about the store being performed, or about the load being performed. Sufficient conditions for a stall include a page offset of the store in the M pipeline stage matching a page offset of data in the coalescing buffer, and the bytes being stored in the M stage of the pipeline also overlapping bytes already existing for the matching entry of the coalescing buffer. As shown in FIG. 2, a stall condition signal 201 is produced by a logical AND operation of a possible hit signal and an overlap signal. Although the stall is not a strictly necessary stall, it is desired since it is unknown in the M+1 pipeline stage until too late for corrective action whether a real overlap condition has occurred. Of course, if it were known, then no predicted stall would be needed.

As discussed in further detail subsequently herein, additional conditions are sufficient for generating additional stall condition signals 203. For example, another sufficient condition for a stall is if the M+1 pipeline stage requires a coalescing buffer store operation, and the coalescing buffer is full. This can be optimized to negate the stall if there is a real hit without overlap, as this store could then write to an available coalescing buffer entry.

Yet another sufficient condition for a stall is if the M pipeline stage requires a load and the page offset matches the page offset of an entry in the coalescing buffer. This stalls until the matching page offset is flushed from the coalescing buffer. This may be further optimized to only stall if there is a real hit into the coalescing buffer.

Yet another sufficient condition for a stall is if the M pipeline stage includes a memory ordering instruction, which requires the coalescing buffer to be flushed and its contents to be issued to the bus and made visible to the other processors in the multiprocessing system.

Figure 3:
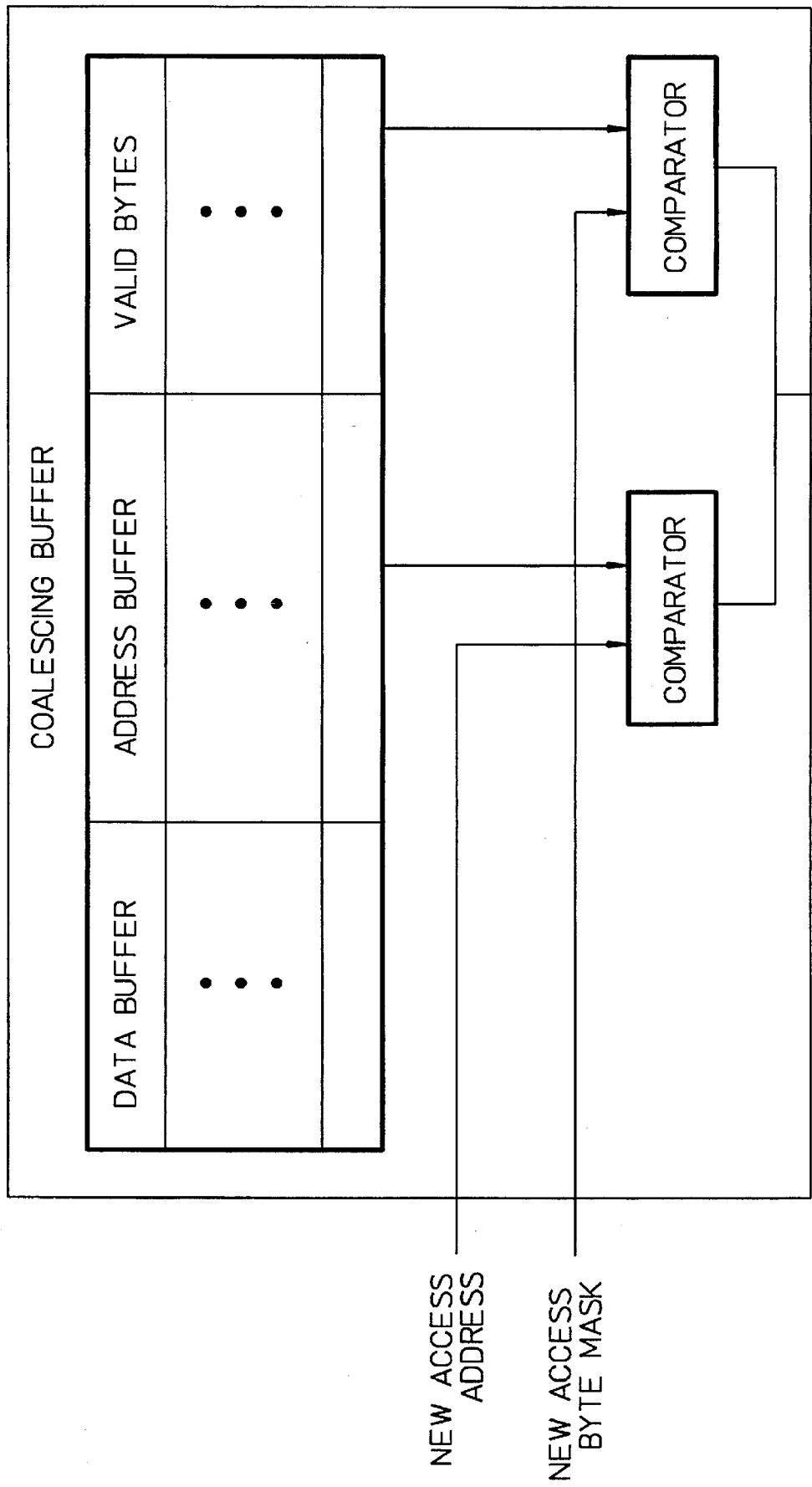
FIG. 3 is a partial block diagram of the coalescing buffer shown in FIGS. 1 and 2.

FIG. 3 is a partial block diagram of the coalescing buffer shown in FIGS. 1 and 2. As shown in FIG. 3, in addition to including entries for a starting address of a line aligned chunk of memory that is being accessed, the data bytes, and valid bits for the bytes, the coalescing buffer further includes one or more comparators for detecting a memory access overlap between non-cacheable data resident in the buffer and new non-cacheable data to be received by the buffer from the central processing unit, and then generates the overlap signal discussed previously herein with respect to FIG. 2. More specifically, the comparators detect the overlap by comparing the address of the non-cacheable data resident in the coalescing buffer with a new access address of the new non-cacheable data, and by comparing the valid bits for the bytes with a new access byte mask. The arrangement shown in FIG. 3 operates as a sequencer in conjunction with the other elements shown in the pipeline diagram of FIG. 2 for storing the non-cacheable data resident in the input/output device before the buffer receives the new overlapping non-cacheable data.

The invention removes complexity from the memory controller for supporting block moves to input/output devices such as graphics display devices and network devices, while additionally lowering the bus bandwidth used in moving data from the central processing unit to such devices. The invention maximizes system performance by placing simple circuitry (from both control complexity and circuit area) coupled with the central processing unit. In accordance with the principles of the invention, system bus bandwidth is used most efficiently by integrally coupling this circuit with the processor, as opposed to employing memory controllers or other logic components to provide any sort of coalescing.

The present invention provides an apparatus including a novel cache subsystem arrangement for efficient management of input/output operations and of memory shared by processors in a multiprocessor (MP) system. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefor, the invention may be practiced otherwise than as specifically described and illustrated.

What is claimed is:

1. A computing system apparatus comprising:
   a) at least one central processing unit for generating non-cacheable data;
   b) a cache arrangement coupled with said central processing unit, said cache arrangement comprising:
      (i) control logic hardware coupled with said central processing unit for generating a signal indicating that said data is non-cacheable and can be combined into non-cacheable data blocks;
      a coalescing buffer coupled with said central processing unit and said control logic, said coalescing buffer being adapted for receiving said non-cacheable data from said central processing unit and for combining said data into non-cacheable blocks of coalesced data in response to said signal from said control logic hardware;
      (iii) a data cache having at least one level and including a static random access memory for storing cacheable data and cache tags having address and line status information for identifying said stored cacheable data;
      (iv) a coalescing store queue for queuing stores of cacheable data received from said central processing unit;
   (c) at least one input/output device; and
   (d) a system bus coupled with the buffer and said input/output device for storing said non-cacheable blocks of data to said input/output device in a single bus transaction to minimize system bus bandwidth use.

2. An apparatus as in claim 1 wherein said coalescing buffer is adapted for receiving disjoint data bytes for each of the non-cacheable blocks of data.

3. An apparatus as in claim 1 wherein the buffer includes:
   a comparator for detecting a memory access overlap between non-cacheable data resident in said coalescing buffer and new non-cacheable data from said central processing unit; and
   a sequencer for storing said non-cacheable resident in said coalescing buffer in said input/output device before said coalescing buffer receives the new overlapping non-cacheable data.

4. A method for managing input/output operations in a computer system, comprising the steps of:
   generating non-cacheable data in at least one central processing unit;
   generating a signal with control logic hardware coupled to said central processing unit indicating that the data is non-cacheable and can be combined into non-cacheable data blocks;
   using an adapted coalescing buffer coupled with said central processing unit and said control logic for combining said data into non-cacheable data blocks within said coalescing buffer in response to said signal;
   queuing stores of cacheable data received from said central processing unit with a coalescing store queue; and
   storing said non-cacheable data blocks to an input/output device in a single bus transaction to minimize system bus bandwidth use.

5. The apparatus of claim 1, wherein said coalescing buffer is adapted for issuing a bus transaction to empty data blocks from said coalescing buffer in a minimal number of bus transactions.

6. The apparatus of claim 1, wherein said control logic hardware comprises:
   records of memory mapped input/output address of said input/output devices coupled to said system bus; and
   at least one comparator for comparing a load or store address of said non-cacheable data to said records of said memory mapped input/output address and for generating a signal indicating that said data is non-cacheable and can be combined into non-cacheable data blocks.

7. The apparatus of claim 1, wherein said coalescing buffer is adapted for coalescing either of load and store data.

8. A method for operating a coalescing buffer, comprising the steps of:

accessing a cache subsystem for loads during an initial stage of an instruction pipe of a central processing unit;

searching a coalescing store queue and a coalescing buffer for Store-Fetch-Interlock conditions in response to said load;

interlocking said initial stage of said instruction pipe in response to a Store-Fetch-Interlock condition until said Store-Fetch-Interlock condition expires;

interlocking said initial stage of said instruction pipe in response to a Store-Store-Interlock condition for a new, non-cacheable and coalescing store until said Store-Store-Interlock condition expires;

flushing at least one entry in said coalescing buffer in response to at least one of a memory ordering instruction, an overlapping coalescing, an overlapping load, and an overlapping store of a size not supported by said coalescing buffer; and stalling said pipeline in response to detection of a condition that may require said flushing of said coalescing buffer.

* * * * *

UNITED STATES PATENT AND TRADEMARK OFFICE
CERTIFICATE OF CORRECTION

PATENT NO.    : 5,664,148
DATED         : September 2, 1997
INVENTOR(S)   : Mulla et al.

It is certified that error appears in the above-identified patent and that said Letters Patent is hereby corrected as shown below:

Column 6,
Line 3, before "a coalescing" insert -- (ii) --

Signed and Sealed this

Eleventh Day of February, 2003

JAMES E. ROGAN
*Director of the United States Patent and Trademark Office*